US012673693B2

(12) United States Patent
Lee

(10) Patent No.: US 12,673,693 B2
(45) Date of Patent: Jul. 7, 2026

(54) METHOD AND APPARATUS FOR DETERMINING AIRPORT TERMINAL TO PARK VEHICLE BY AUTOMATED VALET DRIVING SYSTEM (AVDS)

(71) Applicant: HYUNDAI MOBIS CO., LTD., Seoul (KR)

(72) Inventor: Jae Yong Lee, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 23 days.

(21) Appl. No.: 18/762,870

(22) Filed: Jul. 3, 2024

(65) Prior Publication Data

US 2025/0033663 A1      Jan. 30, 2025

(30) Foreign Application Priority Data

Jul. 28, 2023     (KR) ........................ 10-2023-0098857

(51) Int. Cl.
B60W 60/00          (2020.01)
B60W 30/06          (2006.01)
G01C 21/34          (2006.01)

(52) U.S. Cl.
CPC .......... B60W 60/001 (2020.02); B60W 30/06 (2013.01); G01C 21/3469 (2013.01); *B60W 2530/209* (2020.02); *B60W 2555/20* (2020.02)

(58) Field of Classification Search
CPC .............. B60W 60/001; B60W 30/06; B60W 2530/209; B60W 2555/20; G01C 21/3469
See application file for complete search history.

(56) References Cited

U.S. PATENT DOCUMENTS

| | | | | |
|---|---|---|---|---|
| 2014/0070606 A1* | 3/2014 | Gibeau | .................. | B60K 35/10 |
| | | | | 307/9.1 |
| 2017/0329346 A1* | 11/2017 | Latotzki | ................. | G08G 1/202 |
| 2021/0213844 A1 | 7/2021 | Singuru et al. | | |

FOREIGN PATENT DOCUMENTS

| | | | | | | |
|---|---|---|---|---|---|---|
| BE | 1029338 | B1 | * | 11/2022 | ............. | G01C 21/34 |
| JP | 2019098911 | A | * | 6/2019 | | |
| JP | 7008773 | B1 | | 1/2022 | | |

OTHER PUBLICATIONS

Extended European search report issued on Dec. 3, 2024, in counterpart European Patent Application No. 24187574.9 (12 pages).

* cited by examiner

*Primary Examiner* — Aryan E Weisenfeld
*Assistant Examiner* — Jeffrey R Chalhoub
(74) *Attorney, Agent, or Firm* — NSIP Law

(57)          ABSTRACT

An automated valet driving method includes: identifying a subject vehicle for an automated valet driving system; and performing an autonomous driving operation for the subject vehicle based on a parking location for the subject vehicle. The parking location is determined based on a parking lot around an airport terminal by referring to at least one of illuminance, weather, and electric charge level.

10 Claims, 7 Drawing Sheets

FIG. 1

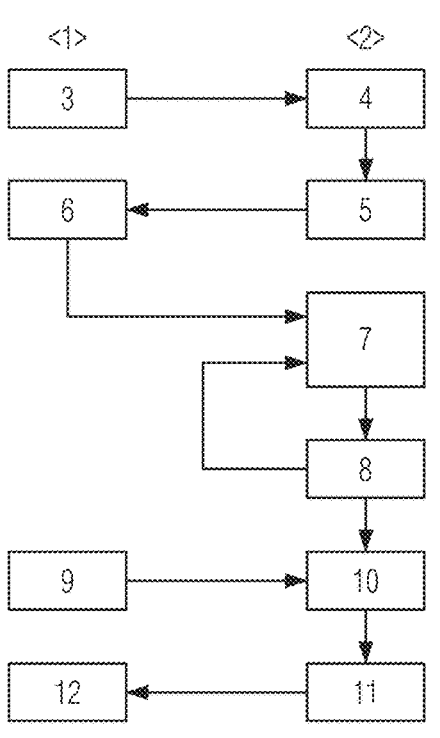

Key
1   User action
2   System reaction
3   Requests avilability
4   Checks vacancy and compatibility
5   Identifies SV and initiates check-in procedure
6   Hands over authority
7   Automated vehicle operation (entering,
    parking, re-parking, driving to service position)
8   Service action by third party
    (e.g. charging, car wash, maintenance)
9   Requests retrieval
10  Automated vehicle operation (exiting)
11  Initiates check-out procedure
12  Receives authority Key
1   operation interface
2   management interfaces
3   Remote vehicle operation
4   On-board vehicle operation
5   User frontend
6   User backend
7   Vehicle backend
8   Operator backend
9   System operator
10  Orchestrating system
11  Value added service system FIG. 6
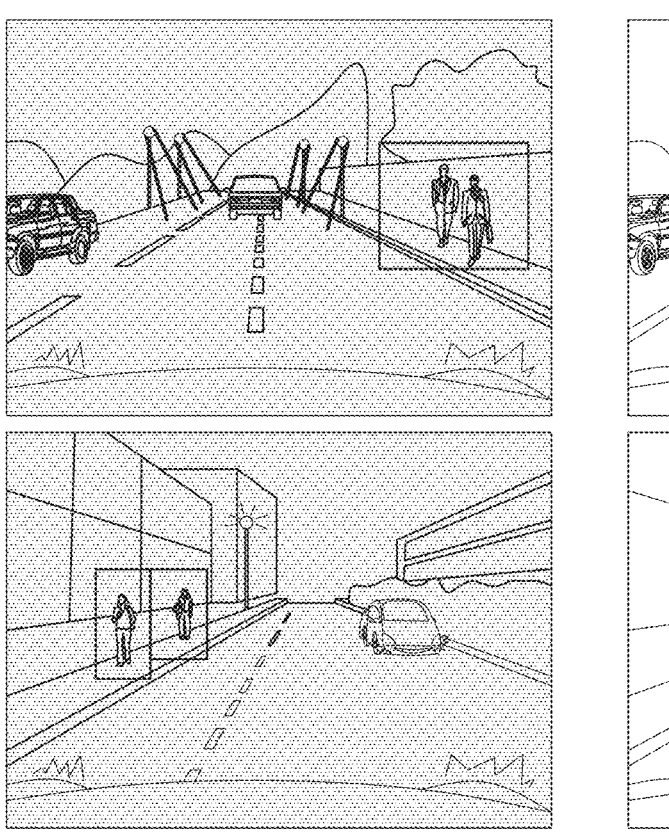
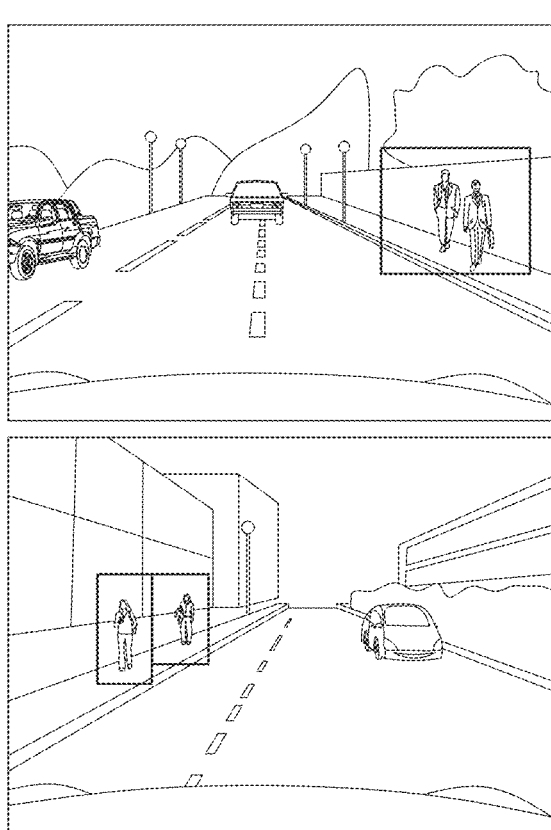

METHOD AND APPARATUS FOR DETERMINING AIRPORT TERMINAL TO PARK VEHICLE BY AUTOMATED VALET DRIVING SYSTEM (AVDS)

CROSS REFERENCE TO RELATED APPLICATION(S)

This application claims the benefit of Korean Patent Application No. 10-2023-0098857, filed on Jul. 28, 2023, which is hereby incorporated by reference as if fully set forth herein.

BACKGROUND

Field of the Disclosure

The embodiments of the present disclosure relate to a method and apparatus for performing automated valet driving of a vehicle.

Discussion of the Related Art

An automated valet driving system (AVDS) includes a user, a system, and an autonomous vehicle. The AVDS may transfer an autonomous driving control authority from the user to the autonomous vehicle. The AVDS can perform valet driving control using an autonomous driving function. In order to control the vehicle to perform valet driving by the AVDS, an efficient control method and the like are required.

SUMMARY

An object of the present disclosure is to provide an apparatus and method for efficiently performing automated valet driving of a vehicle.

Another object of the present disclosure is to provide a method and apparatus for performing automated valet driving by allowing a vehicle to perform autonomous driving, thereby safely and efficiently performing valet driving of a vehicle.

Technical subjects to be solved by the present disclosure are not limited to the above-mentioned technical solutions, and it should be noted that other technical subjects not described above can be understood by those skilled in the art from the description of the present disclosure below.

In accordance with an embodiment of the present disclosure, an automated valet driving method includes: identifying a subject vehicle for an automated valet driving system; and performing an autonomous driving operation for the subject vehicle based on a parking location for the subject vehicle. The parking location is determined based on a parking lot around an airport terminal by referring to at least one of illuminance, weather, and electric charge level.

Performing the autonomous driving operation based on the parking location for the subject vehicle may include determining the illuminance. When the illuminance is lower than a threshold, the parking location may be determined, within a drop-off area of the airport terminal, based on at least one of a charging level of the subject vehicle, a parking fee, and the presence or absence of a parking spot in a vicinity of the drop-off area. When the illuminance is not lower than the threshold, the parking location may be determined, within a pick-up area of the airport terminal, based on at least one of the charging level of the subject vehicle, the parking fee, and the presence or absence of a parking spot in a vicinity of the pick-up area.

Performing the autonomous driving operation based on the parking location for the subject vehicle may include determining the weather. When information about the determined weather falls within a specific weather-related range, the parking location may be determined, within a drop-off area of the airport terminal, based on at least one of a charging level of the subject vehicle, a parking fee, and the presence or absence of a parking spot in a vicinity of the drop-off area. When information about the determined weather is included in a specific weather-related range, the parking location may be determined, within a pick-up area of the airport terminal, based on at least one of the charging level of the subject vehicle, the parking fee, and the presence or absence of a parking spot in a vicinity of the pick-up area.

Performing the autonomous driving operation based on the parking location for the subject vehicle may include checking a degree of electric charges. When the degree of charges is less than a threshold, the parking location may be determined to be a location around a drop-off area of the airport terminal. The threshold may be calculated based on at least one of a distance between a pick-up area and the drop-off area or emergency preparedness power. In a case in which the degree of charges is less than the threshold and a charging station related to a route that is created based on the drop-off area and the pick-up area exists, the parking location may be determined based on the pick-up area of a driver of the subject vehicle.

Performing the autonomous driving operation based on the parking location for the subject vehicle may include checking a degree of electric charges. When the degree of charges is less than a driver's required value, the parking location may be determined to be a location around a drop-off area of the airport terminal. The driver's required value may be calculated based on a driver's input signal. In a case in which the degree of charges is less than the driver's required value and a charging station related to a route that is created based on the drop-off area and the pick-up area exists, the parking location may be determined based on the pick-up area of a driver of the subject vehicle.

Performing the autonomous driving operation based on the parking location for the subject vehicle may include checking a driver's configuration of the subject vehicle. The parking location may be determined to be any one of a location around a drop-off area of the airport terminal or a pick-up area of the airport terminal. The driver's configuration may include at least one of the illuminance, weather, and the electric charge level. In a case in which the driver's configuration includes at least two of the illuminance, the weather, and the electric charge level, the parking location may be determined based on a preset priority.

In accordance with another embodiment of the present disclosure, an automated valet driving apparatus includes a memory; and one or more processors coupled to the memory. The one or more processors identify a subject vehicle for an automated valet driving system; and perform an autonomous driving operation for the subject vehicle based on a parking location for the subject vehicle. The parking location is determined based on a parking lot around an airport terminal by referring to at least one of illuminance, weather, and electric charge level.

The one or more processors may be configured to determine the illuminance. When the illuminance is lower than a threshold, the parking location may be determined, within a drop-off area of the airport terminal, based on at least one of a charging level of the subject vehicle, a parking fee, and the presence or absence of a parking spot in a vicinity of the drop-off area. When the illuminance is not lower than the threshold, the parking location may be determined, within a pick-up area of the airport terminal, based on at least one of the charging level of the subject vehicle, the parking fee, and the presence or absence of a parking spot in a vicinity of the pick-up area.

The one or more processors may be configured to determine the weather. When information about the determined weather falls within a specific weather-related range, the parking location may be determined, within a drop-off area of the airport terminal, based on at least one of a charging level of the subject vehicle, a parking fee, and the presence or absence of a parking spot in a vicinity of the drop-off area. When information about the determined weather is included in a specific weather-related range, the parking location may be determined, within a pick-up area of the airport terminal, based on at least one of the charging level of the subject vehicle, the parking fee, and the presence or absence of a parking spot in a vicinity of the pick-up area.

A vehicle includes: an interface configured to transmit and receive information to/from an automated valet driving system; and a controller configured to control automated valet driving. The controller is configured to: identify a subject vehicle for the automated valet driving system; and perform an autonomous driving operation for the subject vehicle based on a parking location for the subject vehicle. Information about the automated valet driving system is determined based on a parking lot around a terminal of an airport by referring to at least one of an illuminance, a weather, and an electric charge level.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 1 is a conceptual diagram illustrating an example of a basic flow of an automated valet driving system (AVDS) according to the embodiments of the present disclosure.

FIG. 6 is a flowchart illustrating a method for determining a terminal considering illuminance/weather according to the embodiments of the present disclosure.

DETAILED DESCRIPTION

Figure 2:
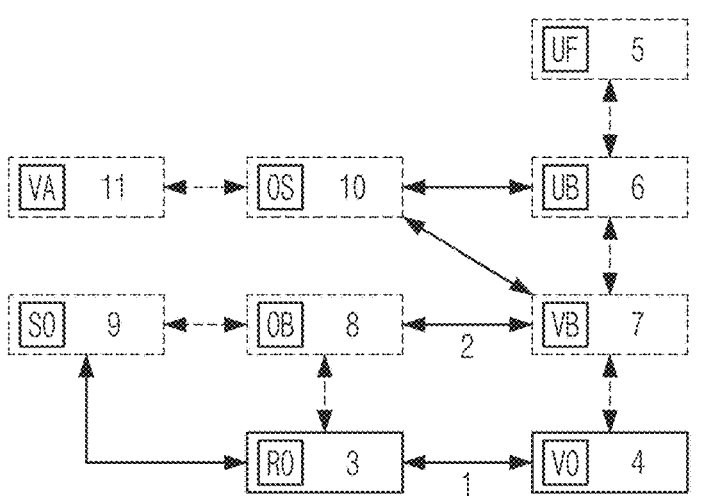
FIG. 2 is a schematic diagram illustrating an example of a system architecture associated with a method and apparatus according to the embodiments of the present disclosure.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

FIG. 1 is a conceptual diagram illustrating an example of a basic flow of an automated valet driving system (AVDS) according to the embodiments of the present disclosure.

FIG. 1 shows the basic flow of an AVDS (Automated Valet Driving Systems). AVDS refers to a use case and operational design domain (ODD) extension of ISO 23374-1 automated valet parking system (AVPS). The AVDS contributes to realization of safe and reliable low-speed Level-4 unmanned operation of vehicles, and facilitates rapid and smooth market introduction of the future L4 system based on experiences gained with AVDS at low speeds in a well-defined ODD.

The automated valet parking system (AVPS) provides low-speed automated valet parking services to owners of vehicles. The AVPS service is not limited to driverless driving within dedicated parking facilities and allows driverless driving in designated outdoor spaces. Basically, both the AVPS and the AVDS are used to conceptually implement a journey (movement) from point A to point B.

One example use case handled by the AVDS is valet parking for use in an airport terminal. Whereas AVPS describes SAE L4 driving for use in a dedicated parking facility, AVDS extends a drop-off area to external areas located outside the parking facility. After the driver of a vehicle leaves the AVDS drop-off area of the designated area, the system may automatically guide a vehicle on public roads to the entrance of the parking facility. At the entrance of the parking facility, the system may guide the vehicle to an empty parking space or, if necessary, to another space. Examples of the space of interest that can be handled by the AVDS may include, for example, electric charging stations, car washes, or may include a vehicle driving case in company premises for logistics purposes, etc.

AVDS is expected to achieve end-user benefits in terms of time saving, stress reduction, reduction in energy consumption of the vehicle, and to meet user expectations for many low-speed operable functions. The AVDS may enable the driver of a vehicle to recognize an automatic charging process of the electric vehicle without unnecessary time consumption of the driver, and may efficiently optimize utilization of charging stations. The AVDS in the company's premises can reduce labor costs using an unmanned vehicle control system.

To contribute to realization of safe and reliable unmanned AVDS operation, the requirements specified in this patent document are based on performance of the state-of-the-art technology currently available. Therefore, this part will be revised in the future as technology improves.

The embodiments of the present disclosure include specific technical solutions for communication interfaces (e.g., communication methods, message protocols) due to differences in technologies (e.g., spectrum allocation) that are available and commonly used worldwide. Thus, in order to ensure interoperability, these specific technical solutions of the embodiments are linked to communication interfaces at national/regional levels.

The automated valet parking system (AVPS) may perform Level-4 autonomous driving of one or more unoccupied vehicles at speeds less than 30 km/h within a designated operating area.

The embodiments specify system frameworks, operational sequences and communication interfaces, performance requirements for operation and management functions, environmental conditions within the operating area, and test procedures to verify performance requirements of the AVDS.

AVDS is considered a use case and ODD (operational design domain) extension of ISO 23374-1, including indoor and outdoor applications. AVDS may enable unmanned operation on company premises and outdoor valet parking on public roads (e.g., valet parking from airport terminals to parking lots), and may also enable additional services. In addition, AVDS may be applied to an example of vehicle driving in the charging stations for electric vehicles or an example of vehicle driving in car washes.

AVDS consists of physically separate subsystems distributed among vehicles, facility equipment, and user domains. The functionality of AVDS is realized by cooperation of these subsystems. In most cases, these AVDS functions are provided by different organizations. The present embodiment includes system architectures implemented using subsystem-to-subsystem communication interfaces at a logical level.

AVDS manages system participants (e.g. AVDS-compatible vehicles, facilities and users) and provides necessary interfaces between the system participants. Embodiments include requirements for various management functions, for example, a function of verifying compatibility between vehicles and premises, a function of performing remote assistance and recovery when autonomous driving is not possible, and a function of issuing shutdown commands in response to actions of other facility users. In addition, AVDS is also intended for use by service providers or facility operators who have received vehicle authorization from individual service recipients.

Embodiments may refer to the following standard documents:
ISO 23374-1, Intelligent transport systems—Automated valet parking systems (AVPS)—Part 1: System framework, requirements for autonomous driving, and communication interface
ISO 20900, Intelligent transport systems—Partially Automated Parking Systems (PAPS)—Performance Requirements and Test Procedures
ISO 8608 Mechanical vibration—Road surface profiles—Reporting of measured data
ISO 19206-2, Road vehicles—Test devices for target vehicles, vulnerable road users and other objects, for assessment of active safety functions—Part 2: Requirements for pedestrian targets ISO 19206-4 Road vehicles—Test devices for target vehicles, vulnerable road users and other objects, for assessment of active safety functions—Part 4: Requirements for bicyclist targets.

Definitions of Terms According to the
Embodiments are as Follows

Service provider of AVDS: An organization that provides the AVDS to operate an unmanned vehicle (driverless vehicle)
User of AVDS: An individual service recipient who transfers/recovers rights (3.3) to/from the service provider through AVDS
Authority: The rights and abilities to perform specific tasks in a subject vehicle (SV).
Subject Vehicle (SV): A vehicle equipped with a vehicle operation subsystem of AVDS
Premises: Public or private areas where AVDS is made available.
Parking facility: A public or private parking lot with AVDS capability.
Operation zone: A geographic area within an AVDS-compliant premises where autonomous driving can be performed.
Drop-off area: A location within an operating area where a user leaves the subject vehicle (SV) and transfers authority over the SV to a service provider.
Pick-up area: A location within the operating area where the service provider transfers the SV for user boarding and hands over authority.
Parking spot: A destination within a work area where one vehicle can be parked or
temporarily stored.
Stop point: A destination within the work area where the SV stops and remains under certain state conditions, depending on the considered use case.
Parking area: An area within the operating area consisting of multiple parking spaces.
The present disclosure relates to a vehicle equipped with a vehicle operation subsystem of a subject vehicle (SV): an AVDS.
Destination: A location within the work area, to which the SV is transported.
Route: A planned course of the SV from a departure to a destination.
Path: A planned sequence of way points for the SV to follow.
Trajectory: A planned route containing time information.

Definitions of Terms for Use in the Automated
Valet Parking Facility are as Follows PFE: Physical equipment installed in parking facilities to support AVPS.

Definitions of Terms for Use in the Automated
Valet Driving Premises Equipment are as Follows DPE: Physical equipment installed in the operating area of AVDS premises to support the AVDS.
Coded Marker: A physical or logical marker using a unique ID installed on the AVDS premises that can be detected by the SV to support localization.
Anonymous marker: A physical or logical marker without a unique ID installed on the AVDS premises that can be detected by the SV to support localization.

Designed speed: A situational speed of a vehicle designed to drive in a given situation (e.g. traffic situation, environmental conditions) determined by AVDS Designed distance: A situational physical distance by design from the SV (to be maintained by the AVDS in a given situation during autonomous driving of the vehicle) to other facilities, road uses, objects or structures.

Subsystem: A logical level of AVDS components that contains one or more functions.

Function: A function of AVDS that is used to process input signals for the system and to convert the input signals into appropriate output signals.

(Autonomous driving service) Reservation: Basic agreement between the user and the service provider regarding the operation and management of SV within specific premises.

(Automated valet Driving) Session: Interaction sequence for a given SV between check-in and check-out.

(Automated valet Driving) Mission: A series of interactions in which the SV is automatically operated by AVDS from a parking location to a destination for a specific purpose.

(Test) Scenario: A description of a complete course from a point of departure to a destination. This (test) scenario is to be performed for testing.

(Test) Scene: A description of specific events to be performed for the test, not including the point of departure or the destination.

System Operator (SO): The role of the organization that manages vehicle operations in the operational area of the AVDS premises. This includes tasks that are monitored while being performed automatically or tasks to be manually performed by an individual at a remote location.

Premises Manager (PM): The role of an organization that maintains work areas in an operable and safe condition according to AVDS requirements Orchestration System (OS): A system that classifies a session or multiple connected sessions into a single mission and arranges the executable and optimized sequence of these missions.

Value added service system (VA): The role of a service system that provides dedicated service management and a communication interface for AVDS.

Definitions of Abbreviations According to the Embodiments are as Follows

ADS: Autonomous driving System
DDT: Dynamic Driving Task
OEDR: Object and Event Detection and Response:
ODD: Operational Design Domain
SV: Subject Vehicle
FV: Forward Vehicle
PFE: Automated valet Parking Facility Equipment
DPE: Automated valet Driving Premises Equipment
VMC: Vehicle Motion Control
DSRC: Dedicated Short Range Communication
VRU: Vulnerable Road User
RO: Remote vehicle Operation (subsystem)
VO: On-board Vehicle Operation (subsystem)
UF: User Frontend (subsystem)
UB: User Backend (subsystem)
VB: Vehicle Backend (subsystem)
OB: Operator Backend (subsystem)
PM: Automated valet Parking facility Management (subsystem)
DM: Automated valet Driving premises Management (subsystem)

VA: Value added service system.

FIG. 1 shows a basic flow of the AVDS based on user actions and system responses. FIG. 1 is a diagram illustrating a representative use case showing the flow in which a user initially transfers authority to a service provider.

In the AVDS, a user can request additional services (e.g. EV charging, car washing) to be performed while the authority of the subject vehicle (SV) remains with the AVDS service provider. The requested service and earliest pickup time can be communicated to the system along with the reservation. While the authorities are already with the AVDS service provider, additional services may be requested depending on the remaining period.

These sessions, which include additional services, consist of more missions and tasks than AVPS. For example, these services may be arranged in the order of parking→waiting→charging→parking→waiting→washing→parking. Configuring the mission within a given time with the order of the requested service is the task of the orchestration system. Additional services are treated as additional missions. The vehicle is driven to a designated location where the service is performed, so that the vehicle is re-parked at an initial parking place or another place. Re-parking occurs automatically after the requested service is completed (e.g., charging is completed, car washing is completed), and there is a parking space available for the next service or is a parking space available for re-parking. In this case, no user request is required. For each additional service, the compatibility between the vehicle and the corresponding service should be checked. To this end, geometric characteristics (e.g., vehicle height, width, length, charging plug location, etc.), electrical characteristics (e.g. plug type, charging power, requested charge level, etc.) and other specific service characteristics are required.

Referring to FIG. 1, reference numeral <1> represents user actions, and reference numeral <2> represents system reactions. The AVDS services can be provided according to the user actions <1> and the system reactions <2>. The autonomous driving methods and devices according to the embodiments of the present disclosure may correspond to user equipment (UE) for user actions and/or a system for system reactions. The autonomous driving method and device according to the embodiments may hereinafter be referred to as an automated valet driving method/apparatus, and more briefly, referred to as only "method/apparatus".

A method/apparatus according to the embodiments may receive a request from a user. The method/apparatus according to the embodiments may check empty spaces for valet driving and compatibility for valet driving. The method/apparatus according to the embodiments may identify the subject vehicle (SV) and activate a check-in process. The method/apparatus according to the embodiments may receive autonomous driving authority from a user. The method/apparatus according to the embodiments may perform automated vehicle operations. For example, operations according to the embodiments may include entering, parking, re-parking, and driving to a service position. The method/apparatus according to the embodiments may selectively perform service actions by a third party. For example, there may be charging, car washing, maintenance, etc. The method/apparatus according to the embodiments may allow the user to submit a retrieval request. The method/apparatus according to the embodiments may perform autonomous vehicle operations. For example, the method/apparatus can perform the exit function. The method/apparatus according to the embodiments may activate a check-out procedure. The method/apparatus according to the embodiments transfers authority to a user.

FIG. 2 is a schematic diagram illustrating an example of a system architecture associated with the method and apparatus according to the embodiments of the present disclosure.

FIG. 2 shows a system structure related to the method and apparatus for performing the basic flow of AVDS (Automated Valet Driving Systems) of FIG. 1.

FIG. 2 shows a logical structure of the AVDS subsystem. Implementation of logical subsystems for physical components may vary depending on the system design. Additionally, a subsystem may consist of multiple physical components. For example, a remote vehicle operation subsystem may consist of sensors, control devices, and communication devices.

The system according to the embodiments may perform and include the method/apparatus according to the embodiments. For example, the AVDS device/system of the method/apparatus according to the embodiments may include an operator backend (OB), an orchestrating system (OS), and/or a remote vehicle operation (RO). The AVDS device/system according to the embodiments may correspond to a server. The user equipment (UE) of the method/apparatus according to the embodiments may include a user frontend (UF) and/or a user backend (UB). The vehicle of the method/apparatus according to the embodiments may include a vehicle backend (VB), and/or an on-board vehicle operation (VO). The system of the method/apparatus according to the embodiments may further include a value added service system (VA) and/or a system operator (SO). Operations according to the embodiments may be performed by each component of the system of FIG. 2. Each component of the system of FIG. 2 may correspond to hardware, software, processor, and/or a combination thereof.

Figure 3:
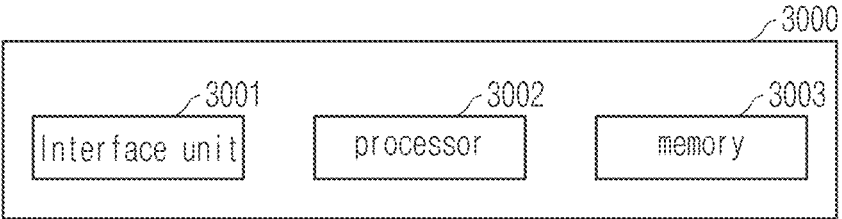
FIG. 3 is a block diagram illustrating an example of a vehicle control device according to the embodiments of the present disclosure.

FIG. 3 is a block diagram illustrating an example of a vehicle control device 3000 according to the embodiments of the present disclosure.

Referring to FIG. 3, the vehicle control device 3000 according to the embodiments is a device designed to control the operation of a vehicle. The vehicle control device may be referred to as an autonomous driving integrated controller 600. The vehicle control device may include an interface unit 3001, a processor 3002, and a memory 3003.

The memory may store instructions, signaling information, data, etc. for performing various operations according to embodiments. The memory may be connected to the interface unit and the processor, so that the memory can transmit and receive necessary signals to and from the interface unit and the processor.

The interface unit may receive signals, information, data, etc. from the vehicle control device and transmit the same to the memory and/or the processor. Additionally, signals, information, data, etc. generated by the memory and/or the processor may be transmitted to the vehicle, the driver and/or passengers.

The processor may perform vehicle control operations based on data and/or instructions stored in the memory.

The vehicle control device of FIG. 3 may correspond to a device mounted on a vehicle or a terminal device that controls the vehicle.

Figure 4:
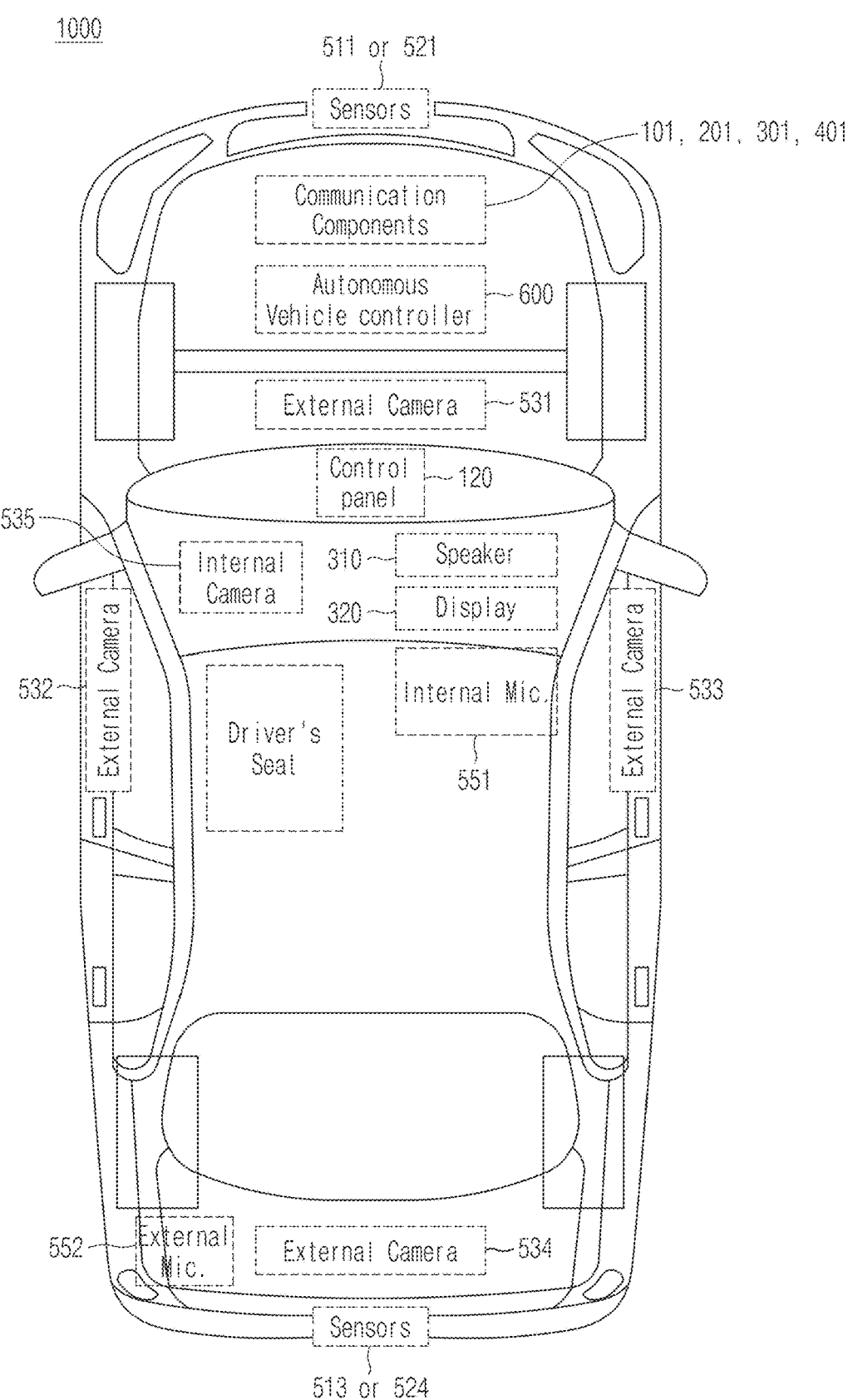
FIG. 4 is a diagram illustrating an example structure of a vehicle according to the embodiments of the present disclosure.

FIG. 4 is a diagram illustrating an example structure of a vehicle according to the embodiments of the present disclosure.

The vehicle according to the embodiments may be configured as shown in FIG. 4 and may perform autonomous driving using an autonomous driving control system. Vehicles according to the embodiments may be referred to as autonomous vehicles, robots, urban air mobility (UAM), autonomous driving devices, etc.

The autonomous vehicle 1000 can be implemented using an autonomous driving integrated controller 600 (denoted by "autonomous vehicle controller" in FIG. 4) that transmits and receives data required to control autonomous driving control of the vehicle through an operation information input interface 101, a driving information input interface 201, a passenger output interface 301, and a vehicle control output interface 401. However, the autonomous driving integrated controller may be referred to as a controller or a processor, or may be referred to as a controller simply.

The autonomous driving integrated controller may acquire, through the driving information input interface, driving information generated by manipulation of a passenger who handles a user input unit during the vehicle's autonomous driving mode or manual driving mode. The user input unit may include a driving mode switch and a control panel 120 (e.g., a navigation terminal mounted in the vehicle, a smartphone or tablet computer carried by the passenger, etc.), and thus the operation information may include information about the vehicle's driving mode and navigation information.

In addition, the autonomous driving integrated controller may provide not only driving status information but also warning information to the driver through the passenger output interface when it is determined that a warning is required for the driver in the autonomous driving mode or the manual driving mode. The autonomous vehicle 1000 may include a speaker 310 for audibly outputting such driving status information and warning information and a display device 320 for visually outputting the driving status information and warning information. At this time, the display device may be implemented as the same device as the control panel described above, or may be implemented as a separate independent device.

Additionally, the autonomous driving integrated controller may transmit, through the vehicle control output interface, control information for vehicle driving control in the vehicle's autonomous driving mode or manual driving mode to a low-order control system (also called a sub-control system) applied to the vehicle. The sub-control system for controlling vehicle driving may include at least one of a motor control system, an engine control system, a braking control system, and a steering control system. The autonomous driving integrated controller may transmit at least one of motor control information, engine control information, braking control information, and steering control information as control information to each sub-control system through the vehicle control output interface.

The autonomous driving integrated controller may acquire operation information caused by the driver's manipulation through the operation information input interface, and may acquire vehicle driving information indicating a driving status of the vehicle through the driving information input interface. The autonomous driving integrated controller may provide driving status information and warning information that are generated according to the autonomous driving algorithm through the passenger output interface.

Meanwhile, in order to ensure stable autonomous driving of the vehicle, the autonomous driving device according to the embodiments may include a sensor unit for detecting objects around the vehicle, such as surrounding vehicles, pedestrians, roads, or fixed facilities (e.g., traffic lights, signposts, traffic signs, construction fences, etc.).

The sensor unit may include one or more of a Lidar sensor, a radar sensor, and a camera sensor to detect surrounding objects outside the vehicle. For example, the sensor unit may include a front Lidar sensor 511, a front radar sensor 521, a rear Lidar sensor 513, a rear radar sensor 524, a left camera sensor 532, a right camera sensor 533, an internal camera sensor 535, a front camera sensor 531, a rear camera sensor 534, etc. The sensor unit may be connected to microphones (551, 552).

Embodiments of the present disclosure may provide a method and apparatus for determining an airport terminal in which the vehicle will park by the automated valet driving system (AVDS), and for convenience of description, the above method and apparatus will hereinafter be referred to as "method/apparatus".

Embodiments of the present disclosure relate to international standards ISO 23374-1 (Automated Valet Parking System, AVPS) and ISO 12768-1 (Automated Valet Driving System, AVDS). The embodiments of the present disclosure provide a method for enabling the AVPS or the AVDS to determine a parking destination (hereinafter referred to as "destination") of an ADS vehicle (having the same concept as the subject vehicle SV).

In the related art, for example, the international standards ISO 23374-1 or ISO 12768-1 have not specifically disclosed a method for determining the airport terminal in which the ADS vehicle will park by the AVPS or AVDS. In order to address this issue, the embodiments may provide a method and apparatus for determining an airport terminal at which a vehicle will park by the AVPS or AVDS.

The AVDS (system/server/processor) for use in the method/apparatus according to the embodiments may include a method for determining an airport terminal in which the ADS vehicle will park, and may perform this method.

For example, the method/apparatus according to embodiments may include a method for determining the airport terminal by considering illuminance, weather, etc., and the method/apparatus may perform this method. Additionally, the embodiments of the present disclosure may include a method for determining the terminal in consideration of the electric charge level, and may perform the method. Further, the embodiments of the present disclosure may include a method for determining the terminal based on the driver's (user's) presetting, and this method can then be performed. According to the embodiments, the AVDS may provide the effect of parking the ADS vehicle in a reasonable location for each situation/condition, rather than simply parking the ADS vehicle in a parking lot close to a pick-up area. Therefore, the AVDS may be the safe and cost-effective and may also provide high user satisfaction.

Figure 5:
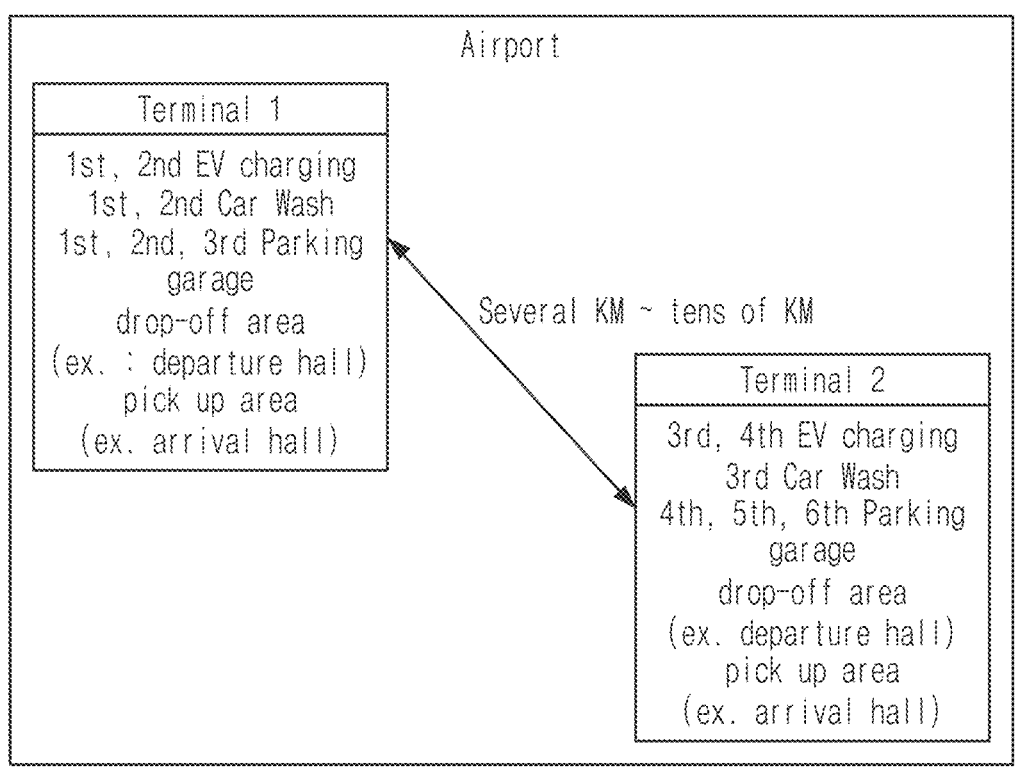
FIG. 5 is a diagram illustrating an example of an AVDS parking terminal according to the embodiments of the present disclosure.

FIG. 5 is a diagram illustrating an example of an AVDS parking terminal according to the embodiments of the present disclosure.

FIG. 5 shows an example of an airport parking terminal for the AVDS, the server, the processor, the vehicle, etc. of FIGS. 1 to 4.

A location related to the method/apparatus according to the embodiments may refer to an airport. The airport may include a first terminal and a second terminal as shown in FIG. 5. Due to geographical characteristics of the airport, the distance between the first terminal (Terminal 1) and the second terminal (Terminal 2) may be long. The airport is merely an example, and locations related to the method/apparatus according to the embodiments may include various parking areas spaced apart from each other as shown in FIG. 5. Referring to FIG. 5, the first terminal (Terminal 1) may include an EV charging facility, a car wash facility, a parking lot, a drop-off area for the departure hall, and a pick-up area for the arrival hall. For example, there may be at least one EV charging facility and at least one car wash facility. The first terminal (Terminal 1) is located several to tens of kilometers away from the second terminal (Terminal 2). For example, the second terminal (Terminal 2) may include an EV charging facility, a car wash facility, a parking lot, a drop-off area for the departure hall, and a pick-up area for the arrival hall. The respective objects to be used in the embodiments will be referred to as the first terminal (Terminal 1), the second terminal (Terminal 2), the first charging station (Charging Station 1), the second charging station (Charging Station 2), the first car wash (Car Wash 1), the second car wash (Car Wash 2), the first parking lot (Parking Lot 1), the second parking lot (Parking Lot 2), etc. for convenience of description and better understanding of the present disclosure.

Definitions of Terms According to the Embodiments are as Follows

Destination: Destination refers to the location where the ADS vehicle will park. In general, the term "destination" will indicate the region extending to a parking spot, and may indicate the concept up to a high-level concept (including Terminal 1 and Parking Lot 1) according to the AVDS.

Drop-off area: This is an area where the driver gets out of the car and leaves autonomous valet parking/driving. From a system perspective, the drop-off area is the area where the driver hands over the authority to the AVDS. For example, there may be an airport terminal departure's entrance/exit, a hotel lobby entrance/exit, and other areas with similar attributes.

Pick-up area: This is an area the driver retrieves and boards the autonomously valet parked/driven vehicle. From a system perspective, the pick-up area is an area where authority handed over to the AVDS is recovered (retrieved). For example, there may be an airport terminal arrival hall entrance/exit, a hotel lobby entrance/exit, and areas with similar attributes.

Operational Design Domain (ODD): The term "ODD" refers to geographical, spatial, physical, and environmental factors in which autonomous driving of the vehicle is performed. For example, the ODD may include an autonomous driving system management area, drivable illuminance, drivable weather, drivable road friction, etc.

The method/apparatus according to embodiments may include a method for determining a terminal to be used for parking of the ADS vehicle at the AVDS airport, and this method can then be performed. As an example of representative situations, the driver (user) is scheduled to drop off at the departure hall of Terminal 1 and is then scheduled to enter the country through the airport's Terminal 2 a few days later. Additionally, the driving distance between terminals may range from several kilometers to tens of kilometers. The AVDS, which receives the control authority from the driver who exits the vehicle at the departure hall of Terminal 1, may determine i) whether to park the ADS vehicle in Terminal 1 close to the drop-off area, or may determine ii) whether to park the ADS vehicle in Terminal 2 close to the pick-up area.

In association with the method of determining a terminal considering illuminance (particularly daytime/nighttime) and/or weather according to embodiments, even though the AVDS (particularly, outdoor AVPS) can operate the ADS vehicle under all weather conditions, it is preferable that the ADS vehicle do not move in situations in which the efficiency of a sensing module is low and the safety guarantee is relatively difficult. In association with the AVDS, which receives the authority from the driver who exits the vehicle in the drop-off area at night (at night/early morning) or in bad weather, when the ADS vehicle directly moves to the parking lot of Terminal 2 in which the pick-up area (e.g., the entrance hall of Terminal 2) exists, the ambient illuminance is low so that the sensing efficiency of the sensing module may decrease (even if there are headlights of the vehicle, the sensing efficiency of the sensing module may definitely decrease compared to the daytime). Thereafter, assuming that the vehicle is driven during the day, operational safety of the vehicle will be high, but there is no need for the vehicle to move with the low sensing efficiency.

In association with the method for determining a terminal considering the degree of electric charging according to embodiments, it may be necessary for the vehicle to move as much as tens of kilometers from the terminal to another terminal. As a result, assuming that the vehicle directly moves to the parking lot of Terminal 2 including the pick-up area (e.g., the entrance hall of Terminal 2) without considering the degree of electric charging, there may occur unexpected problems.

In association with the driver's (user's) pre-configuration method according to embodiments, the driver may pre-configure the AVDS to be operated based on "illuminance/ weather" or may pre-configure the AVDS to be operated based on the degree of electric charging.

In addition, another method in which both the illuminance/weather and the degree of electric charging can be simultaneously considered, may also be pre-configured as necessary. As a default value, although this method is designed to simultaneously consider both of the illuminance/ weather and the degree of electric charging, the scope or spirit of the present disclosure is not limited thereto, and it should be noted that this method can be canceled (not considered) through pre-configuration for each setting time.

FIG. 6 is a flowchart illustrating a method for determining a terminal considering illuminance/weather according to embodiments of the present disclosure.

The AVDS, the server, the processor, the vehicle, etc. of FIGS. 1 to 4 may determine the terminal by considering the illuminance and/or weather as shown in FIG. 6 under the same environment as that of FIG. 5.

When driving at night, the efficiency of sensing the surrounding objects by a camera or the like from among the sensing modules will decrease compared to daytime driving. In this case, the sensing efficiency can be increased by using a night filter, but it is impossible for the increased sensing efficiency to match the sensing efficiency of such daytime driving. In bad weather, the efficiency of sensing the surrounding objects by Lidar/camera, etc. from among the sensing modules will decrease.

Embodiments determine the terminal by considering illuminance (particularly, daytime/nighttime).

The method/apparatus according to the embodiments may include 1) determining whether the illuminance level is low and 2) determining the parking area based on the determined illuminance, and this method is then performed.

Referring to the step (1) of determining whether the illuminance level is high or low, when the illuminance sensed by the ADS vehicle and/or the peripheral infrastructure of the ADS vehicle is less than a preset first threshold, the AVDS may determine that the illuminance level is low.

For example, the first threshold may be a value considering the illuminance environment, for example, 10 lx, 50 lx, or the like. The AVDS can determine whether the illuminance level is low by considering the current season and current time. For example, if the current season is summer, the AVDS may determine that the current external illuminance level is low from 9 PM onwards.

Referring to the step (2) of determining the parking area based on the determined illuminance level, the AVDS may determine, based on the determined low illuminance, the destination to be a peripheral region of the drop-off area rather than a peripheral region of the pick-up area. That is, if it is determined that the illuminance level is not low, the destination may be determined to be a parking lot around the pick-up area, for example, a parking lot around the arrival hall of Terminal 2. At this time, the parking lot can be determined, at Terminal 2, to be i) a parking lot closest to a pick-up area, ii) a parking lot where EV charging is possible while parking, or iii) a parking lot with the lowest parking fee. If it is determined that the illuminance level is low, the destination may be determined to be a parking lot around the drop-off area, for example, a parking lot around the departure hall of Terminal 1. At this time, the parking lot can be determined, at Terminal 1, to be any one of i) the parking lot closest to the drop-off area, ii) the parking lot where EV charging is possible while parking, or iii) the parking lot with the lowest parking fee. Embodiments can determine the terminal by considering the weather.

The method/apparatus according to the embodiments may include the steps of 1) determining whether there occurs bad weather, and 2) determining a parking area based on the determined bad weather.

Referring to the step (1) of determining whether there occurs bad weather, the AVDS can determine whether the current weather corresponds to bad weather by analyzing rain/snow/hail/lightning identified through the camera module of the ADS vehicle. The AVDS can request the ADS vehicle to perform testing of the LiDAR sensing efficiency. As a result of the LIDAR sensing efficiency test, if the sensing efficiency decreases by more than a % compared to usual, it can be determined that the current weather corresponds to bad weather.

Referring to the step (2) of determining the parking area based on the determined bad weather, the AVDS may determine, based on determination of such bad weather, the destination to be the drop-off area rather than a peripheral area around the pick-up area. That is, if it is determined that the current weather does not correspond to bad weather, the AVDS may determine the destination to be a parking lot around the pick-up region, for example, a parking lot around the arrival hall of Terminal 2. At this time, the parking lot can be determined, at Terminal 2, to be any one of i) the parking lot closest to the pick-up area, ii) the parking lot where EV charging is possible while parking, or iii) the parking lot with the lowest parking fee. If it is determined that the current weather corresponds to bad weather, the AVDS may determine the destination to be a parking lot around the drop-off area, for example, a parking lot around the departure hall of Terminal 1. At this time, the parking lot can be determined, a Terminal 1, to be any one of i) the parking lot closest to the drop-off area, ii) the parking lot where EV charging is possible while parking, or iii) the parking lot with the lowest parking fee.

In association with the method of determining a terminal by considering the level of electric charges according to embodiments, if the level of electric charge is less than a preset second threshold, the destination may be determined to be a peripheral region around the drop-off area. In association with the preset second threshold, the second threshold may be expressed as a percentage (0≤second threshold≤100(%)), and may be calculated by the AVDS based on various factors, for example, necessary driving distance (e.g., a distance between Terminal 1 and Terminal 2), an emergency preparedness power, a waiting-for-signal status, a parking-order waiting status, etc. For example, the emergency preparedness power may be determined through average calculation based on the history accumulated in the AVDS. Additionally, the emergency preparedness power may also be determined by machine learning of a machine learning module included in either the ADS vehicle or the AVDS. The average calculation based on the history accumulated in the AVDS may mean the average calculation for the accumulated history of the same vehicle model as the ADS vehicle.

As an exceptional case, if the level of electrical charges is less than a preset second threshold and the destination is determined to be a location around a pick-up area, for example, although the level of electrical charges is low (below the second threshold), if EV charging is possible on the road where Terminal 1 is connected to Terminal 2, the AVDS may determine the destination to be a location around the drop-off area. The AVDS can receive, from an airport administrator (e.g., server), EV charging type information and EV charging cost information that can be provided by the road. The AVDS can determine whether the ADS vehicle can accept the EV charging function that can be provided by the road, based on the EV charging type information received from the airport administrator and the information about the acceptable EV charging type received from the ADS vehicle (server). For example, when it is determined that the AVDS is unable to receive the EV charging function provided by the road, such exceptional case is not applied to the ADS vehicle.

In addition, the AVDS may receive, from the airport administrator, the on-road EV charging system administrator, or the ADS vehicle (server), information as to whether the ADS vehicle has a (season) ticket or pass for the on-road EV charging. In the case (i), when the ADS vehicle has the EV charging pass, the destination may be determined to be a location around the pick-up area according to this exceptional case. In the case (ii), when the ADS vehicle does not have the EV charging pass, the AVDS may first consider a preset EV charging cost limit and may thus allow the corresponding vehicle to use the on-road EV charging only when the on-road EV charging costs do not exceed the EV charging cost limit.

In association with the method of determining a terminal by considering the level of electric charge according to embodiments, if the level of electric charges does not meet the driver's requirement, the destination may be determined to be a location around the drop-off area. Looking at the driver's request, the driver can transmit the electric charge level "required value" to the AVDS through the ADS vehicle or the user interface (e.g. a smartphone). Here, the required value may be, for example, a percentage compared to full charge. The driver may arbitrarily enter a real number between 0 and 100. Alternatively, when the AVDS displays examples of the required values (e.g. 5, 10, 15, 20, 25, 30, 50, etc.), the user may select a desired value through touch input on the display. Alternatively, the AVDS may also be configured such that the driver can transmit the required value to the AVDS server at any time. For example, the driver may transmit the required value to the AVDS server at any time, for example, a time point before the authority is handed over from the driver to the AVDS server, a hand-over time point, a time point at which the AVDS server decides the destination, etc. (through the ADS vehicle or the user interface). Alternatively, the driver may transmit the required value to the AVDS server only at a specific time/in a specific situation. For example, the driver can transmit the required value at the time of AVDS reservation. Alternatively, the driver can transmit the required value at the authority handover time point at which the authority is handed over to the AVDS server. As an exception to this, the above-described exceptions may be equally applied to the embodiments of the present disclosure.

In association with the driver's (user's) pre-configuration according to embodiments, the user may preset one key decision factor. The driver may determine the key decision factor in advance. The AVDS may determine whether to park the vehicle around the drop-off area or around the pick-up area. In this case, the key decision factor previously set by the user can be used. If the user sets "illuminance/weather" as a key decision factor in advance, the AVDS may determine whether to park the vehicle around the drop-off area or around the pick-up area using the same method as the method for determining the terminal in consideration of the illuminance/weather. If the user sets "electrical charge level" as the key decision factor in advance, the AVDS may determine whether to park the vehicle around the drop-off area or around the pick-up area using the same method as the method for determining the terminal in consideration of the electric charge level. Pre-configuration information may be transmitted from the driver's user interface (User Interface) to the ADS vehicle or the AVDS, and may be transmitted at ordinary times or at a handover moment where the authority of controlling the ADS vehicle is handed over to the AVDS.

In association with the driver's (user's) pre-configuration according to embodiments, considering the plurality of key decision factors previously set by the user, the driver may enable the AVDS to be pre-configured such that the AVDS can determine whether to park the vehicle around the drop-off area or around the pick-up area by considering both of "illuminance/weather" and "electric charge level". When the AVDS determines that the illuminance/weather conditions are not good using the method of determining the terminal in consideration of the illuminance/weather or when the AVDS determines that the electric charge information is not good using the method of determining the terminal in consideration of the electric charge level, the AVDS may decide to park the vehicle around the drop-off area. When the above-described situation is compared with the case considering only "illuminance/weather" or the other case considering "electrical charging information", there may arise some differences in the decision algorithm/results. In association with the driver's (user's) pre-configuration according to the embodiments, based on the default settings and the driver's selection for each situation, the AVDS may set the operation of considering both "illuminance/weather" and "electric charge level" as the default setting when determining whether to park the vehicle around the drop-off area or around the pick-up area. In a situation where the default setting is made as described above, the default setting can be changed in response to the driver's request. For example, when the authority is handed over in the drop-off area of Terminal 1, the driver may request that the illuminance/weather condition not be considered when the above decision is made through the interface of the ADS vehicle. Related examples can be expanded/modified, etc.

Figure 7:
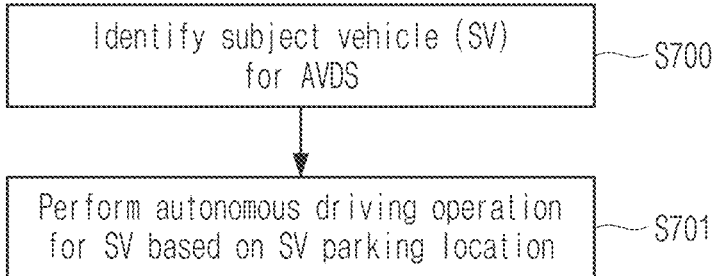
FIG. 7 is a flowchart illustrating an automated valet driving method according to the embodiments of the present disclosure.

FIG. 7 is a flowchart illustrating an automated valet driving method according to the embodiments of the present disclosure.

FIG. 7 shows how the AVDS/server/processor of FIGS. 1 and 2, the processor of FIG. 3, the vehicle of FIG. 4, etc. control the automated valet driving under the environments of FIGS. 5 and 6, etc.

The automated valet driving method according to the embodiments may include identifying the subject vehicle (SV) for the AVDS (S700).

The automated valet driving method may further include performing the autonomous driving operation for the SV based on the parking location for the SV (S701). Referring to FIG. 7, the automated valet driving method according to embodiments may include identifying the subject vehicle (SV) for AVDS; and performing autonomous driving operations for the SV. The step of performing the autonomous driving operation for the SV may include determining the parking location for the SV.

In association with the method for determining the parking terminal based on illuminance, the step of determining the parking location for the SV may include determining the illuminance. Based on the illuminance, the parking location may be determined. To determine the parking locations, it may be possible to consider example cases in which the driver performs entry and exit procedures at the airport's Terminal 1 and Terminal 2. For example, when the driver of a vehicle leaves the country at Terminal 1 and enters the country at Terminal 2, the drop-off area may be the departure hall of Terminal 1, and the pick-up area may be the arrival hall of Terminal 2. Terminal 1 may be referred to as the first location. The first location may include a drop-off area. Terminal 2 may be referred to as Location 2. The second location may include a pick-up area. In order to determine a destination of the parking location for automated valet driving, a suitable destination can be determined among the vicinity of the drop-off area at the first location and/or the vicinity of the pick-up area at the second location based on illuminance/weather, charge level, parking fee, etc. For example, embodiments may determine either a parking lot close to the drop-off area or a parking lot with low parking costs among the drop-off areas around the first location, to be the destination. In the area surrounding the pick-up area around the second location, a parking lot close to the pick-up area or a parking lot with low parking costs may be determined as the destination. In this way, the AVDS may control where the SV will park. The step of performing the autonomous driving operation may include determining the illuminance. If the illuminance is less than the threshold, the parking location may be determined, among the drop-off area of the terminal of the airport, based on at least one of the SV charge level, the parking fee, and the presence or absence of a parking spot close to the drop-off area. If the illuminance is not less than the threshold, the parking location may be determined, among the pick-up area of the terminal of the airport, based on at least one of the SV charge level, the parking fee, and the presence or absence of a parking spot close to the pick-up area.

In association with the method for determining the parking terminal based on weather information, the method for performing the autonomous driving operation based on the SV parking location may include determining the weather. If the information about the determined weather falls within a specific weather-related range (e.g., weather condition values indicating bad weather such as snow, rain, fog, etc.), the parking location may be determined, among the drop-off area of the airport terminal, based on at least one of the SV charge level, the parking fee, and the presence or absence of the parking spot close to the drop-off area. If the information about the determined weather is not included in the specific weather-related range, the parking location may be determined, among the pick-up area of the airport terminal, based on at least one of the SV charge level, the parking fee, and the presence or absence of the parking spot close to the pick-up area.

In association with the method for determining the terminal based on the electric charge degree threshold, the method of determining the autonomous driving operation based on the SV parking location may include checking the degree of electric charge. If the electric charge degree is less than the threshold, the parking location may be determined to be a location around the drop-off area of the terminal of the airport. The threshold may be calculated by at least one of the distance between the pick-up area and the drop-off area of the airport or the emergency preparedness power. If the electric charging degree is less than the threshold and if the charging station related to a route that is created based on the drop-off area and the pick-up area exists, the parking location may be determined based on the pick-up area of the driver of the SV. In this case, the parking fees, the distance, etc. can be additionally considered.

In association with the method for determining the terminal based on the driver's required value related to the electric charge degree, the method of determining the autonomous driving operation based on the SV parking location may include checking the degree of electric charge. If the electric charge degree is less than the driver's required value, the parking location may be determined to be a location around the drop-off area of the terminal of the airport, and the driver's required value may be calculated based on the driver's input signal. If the electric charging degree is less than the driver's required value and if the charging station related to a route that is created based on the drop-off area and the pick-up area exists, the parking location may be determined based on the pick-up area of the driver of the SV. In this case, the parking fees, the distance, etc. can be additionally considered.

In association with the method for determining the terminal based on the driver's pre-configuration, the method for performing the autonomous driving operation based on the SV parking location may include checking configuration information of the SV's driver. The parking location may be determined to be one of a location around the drop-off area of the airport terminal and a location around the pick-up area of the airport terminal. Here, the configuration information may include at least one of illuminance, weather, charging degree, etc. If the configuration includes at least two of the illuminance, the weather, and the electric charging degree, the parking location may be determined based on the configured priority.

The automated valet driving method may be performed by the automated valet driving device. Referring to FIGS. 2 and 3, the automated valet driving device may include a memory and a processor connected to the memory. The processor may identify the subject vehicle (SV) for the AVDS, may perform the autonomous driving operation for the SV, and may determine the parking location for the SV.

Referring to FIG. 4, the vehicle may include an interface for transmitting and receiving information to/from the AVDS and a controller for controlling the automated valet driving. The controller may identify the subject vehicle (SV) for AVDS, and may perform autonomous driving operation for the SV based on the SV parking location. Information related to the AVDS may include parking location information that is determined based on the parking lot located around the airport terminal by referring to at least one of the illuminance, weather, or charging level. The information may include not only parking spot information determined in relation to the drop-off area and the pick-up area based on the illuminance, weather, charging level, etc., but also data related to the determined parking spot information.

The maximum speed of the vehicle according to embodiments may be limited to 30 km/h. The system according to embodiments has the ability to actually drive at least 30 km/h on public roads where other road users may be in the way when driving at a lower speed.

The AVDS can enable the vehicle to drive from a drop-off area to a dedicated destination (for example, a parking space at a parking facility or another destination (e.g., the EX charging station) for each use case). In addition, the SV can also be placed within the pick-up area to facilitate smooth boarding of users and passengers and loading of goods (if applicable).

In order to efficiently distribute the parking spaces, the AVDS may allow the vehicles to be parked in the parking spaces while being spaced a predetermined distance of 20 cm or less from each other in all directions. Detailed ODD definitions must be provided by a site operator depending on site conditions and constraints.

The embodiments of the present disclosure may determine the autonomous parking area for vehicles while realizing superior time/cost efficiency and improving driver satisfaction.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments. Additionally, the processor may be implemented as an encoder/decoder, etc. for the operations of the above-described embodiments.

As described above, related contents have been described in the best mode for carrying out the embodiments.

As described above, the embodiments may be fully or partially applied to the automated valet driving device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

As is apparent from the above description, the method and apparatus according to the embodiments of the present disclosure can efficiently perform automated valet driving of a vehicle.

The method and apparatus according to the embodiments of the present disclosure can safely perform automated valet driving of a vehicle.

The method and apparatus according to the embodiments of the present disclosure can accurately perform automated valet driving of a vehicle.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An automated valet driving method comprising:
identifying a subject vehicle for an automated valet driving system;
measuring, by vehicle-mounted sensors, illuminance, weather, and a state-of-charge (SoC) of a battery of the subject vehicle;
performing an autonomous driving operation for the subject vehicle based on a parking location for the subject vehicle,
wherein the parking location is determined based on a parking lot around an airport terminal by referring to at least one of an illuminance, a weather, and an electric charge level;
computing, by the system, an SoC threshold derived from at least a distance between terminal areas and an emergency-preparedness energy reserve, and selecting the parking location based on the measured SoC relative to the threshold; and in response to the selected parking location, generating a drivable trajectory within an operational design domain and commanding a vehicle motion controller to execute the trajectory without human intervention,
wherein the operational design domain includes geographical, spatial, physical, and environmental factors in which autonomous driving of the subject vehicle is performed including at least one of an autonomous driving system management area, drivable illuminance, drivable weather, or drivable road friction.

2. The automated valet driving method according to claim 1, wherein performing the autonomous driving operation based on the parking location for the subject vehicle includes:
determining the illuminance,
wherein
when the illuminance is lower than a threshold, the parking location is determined, within a drop-off area of the airport terminal, based on at least one of a charging level of the subject vehicle, a parking fee, and the presence or absence of a parking spot in a vicinity of the drop-off area; and
when the illuminance is not lower than the threshold, the parking location is determined, within a pick-up area of the airport terminal, based on at least one of the charging level of the subject vehicle, the parking fee, and the presence or absence of a parking spot in a vicinity of the pick-up area.

3. The automated valet driving method according to claim 1, wherein performing the autonomous driving operation based on the parking location for the subject vehicle includes:
determining the weather,
wherein
when information about the determined weather falls within a specific weather-related range, the parking location is determined, within a drop-off area of the airport terminal, based on at least one of a charging level of the subject vehicle, a parking fee, and the presence or absence of a parking spot in a vicinity of the drop-off area; and
when information about the determined weather is included in a specific weather-related range, the parking location is determined, within a pick-up area of the airport terminal, based on at least one of the charging level of the subject vehicle, the parking fee, and the presence or absence of a parking spot in a vicinity of the pick-up area.

4. The automated valet driving method according to claim 1, wherein performing the autonomous driving operation based on the parking location for the subject vehicle includes:
checking a degree of electric charges,
wherein
when the degree of charges is less than a threshold, the parking location is determined to be a location around a drop-off area of the airport terminal,
wherein
the threshold is calculated based on at least one of a distance between a pick-up area and the drop-off area or emergency preparedness power; and
in a case in which the degree of charges is less than the threshold and a charging station related to a route that is created based on the drop-off area and the pick-up area exists, the parking location is determined based on the pick-up area of a driver of the subject vehicle.

5. The automated valet driving method according to claim 1, wherein performing the autonomous driving operation based on the parking location for the subject vehicle includes:

checking a degree of electric charges, wherein when the degree of charges is less than a driver's required value, the parking location is determined to be a location around a drop-off area of the airport terminal, wherein the driver's required value is calculated based on a driver's input signal; and in a case in which the degree of charges is less than the driver's required value and a charging station related to a route that is created based on the drop-off area and the pick-up area exists, the parking location is determined based on the pick-up area of a driver of the subject vehicle.

6. The automated valet driving method according to claim 1, wherein performing the autonomous driving operation based on the parking location for the subject vehicle includes:

checking a driver's configuration of the subject vehicle, wherein the parking location is determined to be any one of a location around a drop-off area of the airport terminal or a pick-up area of the airport terminal, wherein the driver's configuration includes at least one of the illuminance, the weather, and the electric charge level; and in a case in which the driver's configuration includes at least two of the illuminance, the weather, and the electric charge level, the parking location is determined based on a preset priority.

7. An automated valet driving apparatus comprising:

a memory; and one or more processors coupled to the memory, wherein the one or more processors are configured to:

receive sensor measurements of illuminance, weather, and a state-of-charge (SoC) of a battery;

identify a subject vehicle for an automated valet driving system;

perform an autonomous driving operation for the subject vehicle based on a parking location for the subject vehicle, wherein the parking location is determined based on a parking lot around an airport terminal by referring to at least one of an illuminance, a weather, and an electric charge level;

compute, by the processors, an SoC threshold derived from at least a distance between terminal areas and an emergency-preparedness energy reserve and select the parking location based on the measured SoC relative to the threshold; and generate a drivable trajectory within an operational design domain and command a vehicle motion controller to execute the trajectory without human intervention, wherein the operational design domain includes geographical, spatial, physical, and environmental factors in which autonomous driving of the subject vehicle is performed including at least one of an autonomous driving system management area, drivable illuminance, drivable weather, or drivable road friction.

8. The automated valet driving apparatus according to claim 7, wherein the one or more processors are configured to:

determine the illuminance, wherein when the illuminance is lower than a threshold, the parking location is determined, within a drop-off area of the airport terminal, based on at least one of a charging level of the subject vehicle, a parking fee, and the presence or absence of a parking spot in a vicinity of the drop-off area; and when the illuminance is not lower than the threshold, the parking location is determined, within a pick-up area of the airport terminal, based on at least one of the charging level of the subject vehicle, the parking fee, and the presence or absence of a parking spot in a vicinity of the pick-up area.

9. The automated valet driving apparatus according to claim 7, wherein the one or more processors are configured to:

determine the weather wherein when information about the determined weather falls within a specific weather-related range, the parking location is determined, within a drop-off area of the airport terminal, based on at least one of a charging level of the subject vehicle, a parking fee, and the presence or absence of a parking spot in a vicinity of the drop-off area; and when information about the determined weather is included in a specific weather-related range, the parking location is determined, within a pick-up area of the airport terminal, based on at least one of the charging level of the subject vehicle, the parking fee, and the presence or absence of a parking spot in a vicinity of the pick-up area.

10. A vehicle comprising:

an interface configured to transmit and receive information to/from an automated valet driving system; and a controller configured to control automated valet driving, wherein the controller is configured to:

receive sensor measurements of illuminance, weather, and a state-of-charge (SoC) of a battery;

identify a subject vehicle for the automated valet driving system;

perform an autonomous driving operation for the subject vehicle based on a parking location for the subject vehicle, wherein information about the automated valet driving system is determined based on a parking lot around a terminal of an airport by referring to at least one of an illuminance, a weather, and an electric charge level;

compute an SoC threshold derived from at least a distance between terminal areas and an emergency-preparedness energy reserve and select the parking location based on the measured SoC relative to the threshold; and generate a drivable trajectory within an operational design domain and command a vehicle motion controller to execute the trajectory without human intervention, wherein the operational design domain includes geographical, spatial, physical, and environmental factors in which autonomous driving of the subject vehicle is performed including at least one of an autonomous driving system management area, drivable illuminance, drivable weather, or drivable road friction.

* * * * *